Patented Jan. 26, 1937

2,068,880

UNITED STATES PATENT OFFICE 2,068,880

PRESERVATION OF TEXTILES, LEATHER, AND WOOD

Artturi Ilmari Virtanen, Helsinki, Finland

No Drawing. Application November 15, 1934, Serial No. 753,245. In Sweden November 20, 1933

1 Claim. (Cl. 21—43)

Micro-organisms—molds, yeasts, and bacteria—are known to cause considerable damage and material losses in various organic materials. Industrial products, notably those of textile, leather, and wood working industries are likewise severely attacked by micro-organisms.

Various methods have been proposed in order to reduce the losses caused by micro-organisms. Some of these methods comprise the treating of the products to be preserved with suitable chemicals which will either destroy the micro-organisms or render their development impossible. Thus, I have previously found that certain organic compounds, e. g. acrolein, diacetyl, and esters of isothiocyanic acid have more or less marked microbicidal properties. These as well as several other previously known preservatives are, however, in many ways unsatisfactory, particularly as their price is often too high for a profitable technical use.

I have therefore tried to find new preservatives which would permit an effective conservation of the products at a low cost. An extensive research has now shown that various technical products, notably those of textile, leather, and wood working industries can be successfully protected against the action of micro-organisms by the use of mono-chlorinated mercurized naphthalene.

Special experiments showed that the fungicidal effect of the mercury-substituted chlor-naphthalenes is about ten times higher than that of the corresponding chlor-naphthalenes. Further it was found that the said preservative can be successfully used also in conjunction with previously known substances, e. g. isothiocyanic esters.

The said preservative is added to the products to be preserved either as such, or dissolved in suitable solvents, or as emulsions. The following example shows how my invention is carried out in practice.

Example

A mixture of 95–90 parts of chlor-naphthalene and 5–10 parts of mercury acetate is heated until the major part of the acetic acid has evaporated. The clear solution thus obtained, either emulsified or dissolved in a suitable solvent, is sprayed from an atomizer onto the surface of cellulose or wood pulp sheets, in amounts from 10 to 100 ml. per ton.

I claim:

A method of protecting various products of textile, leather, and wood working industries against the action of micro-organisms, comprising treating the said products with a preservative consisting essentially of mono-chlorinated mercurized naphthalene.

ARTTURI ILMARI VIRTANEN.